United States Patent [19]

Fergg et al.

[11] 4,101,217

[45] Jul. 18, 1978

[54] AUTOMATIC COLOR PRINTING APPARATUS

[75] Inventors: Berthold Fergg, Taufkirchen; Wolfgang Zahn, Munich; Walter Knapp, Taufkirchen, all of Fed. Rep. of Germany

[73] Assignee: AGFA-Gevaert A.G., Leverkusen, Fed. Rep. of Germany

[21] Appl. No.: 711,595

[22] Filed: Aug. 4, 1976

[30] Foreign Application Priority Data

Jun. 8, 1975 [DE] Fed. Rep. of Germany ....... 2535034

[51] Int. Cl.² .......................................... G03B 27/78
[52] U.S. Cl. ...................................................... 355/38
[58] Field of Search ................ 355/71, 77, 67, 68, 355/32, 35, 38

[56] References Cited

U.S. PATENT DOCUMENTS

| 3,110,761 | 11/1963 | Allen et al. | 355/35 X |
|---|---|---|---|
| 3,400,632 | 9/1968 | Wahlt | 355/77 X |
| 3,502,410 | 3/1970 | King et al. | 355/38 |
| 3,527,540 | 9/1970 | Bowker et al. | 355/38 X |
| 3,653,759 | 4/1972 | Klein | 355/38 |
| 3,697,174 | 10/1972 | McCune | 355/38 |
| 3,709,613 | 1/1973 | Zahn et al. | 355/68 X |
| 3,797,933 | 3/1974 | Sable | 355/77 X |
| 3,819,275 | 6/1974 | Aimi et al. | 355/38 X |
| 3,888,580 | 6/1975 | Amano et al. | 355/38 |
| 3,944,362 | 3/1976 | Dailey | 355/68 X |

FOREIGN PATENT DOCUMENTS

260,146 6/1965 Australia ................................. 355/77

*Primary Examiner*—Donald A. Griffin
*Attorney, Agent, or Firm*—Peter K. Kontler

[57] ABSTRACT

An exposure control for use in photographic color printing apparatus has transducers which are sensitized in the additive primary colors and scan discrete areas of an original to transmit appropriate signals to integrator circuits which, in turn, transmit signals for regulation of the ratio of primary colors in printing light. The transducers further transmit signals to circuits which determine the presence of one or more areas of predominant color in an original and modify the signals which are transmitted to the integrators, either by weakening the intensity or by preventing the transmission of corresponding transducer signals. Detection of areas of predominant color can result in generation of signals which are used to contribute to determination of the total amount of printing light.

21 Claims, 5 Drawing Figures

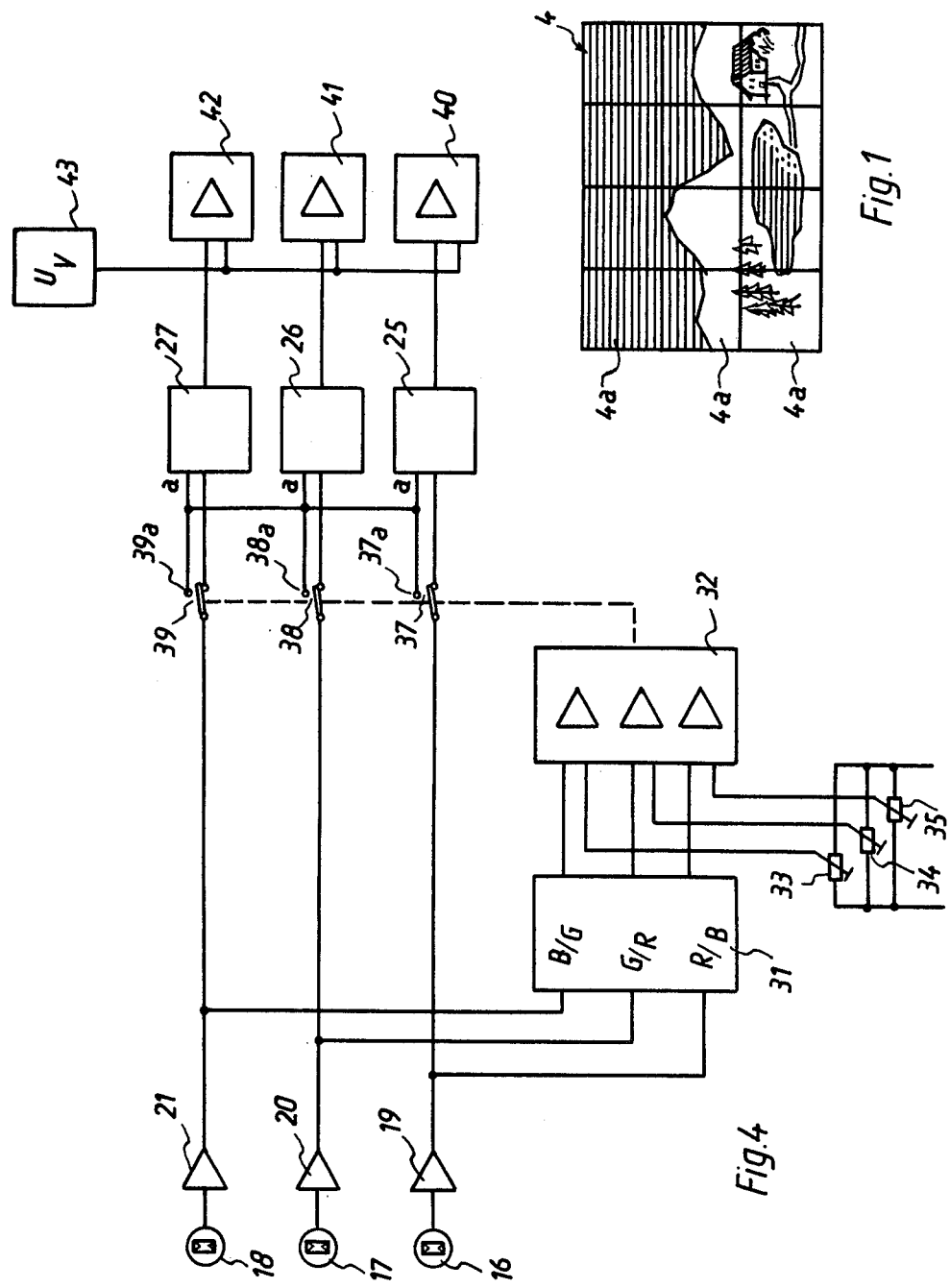

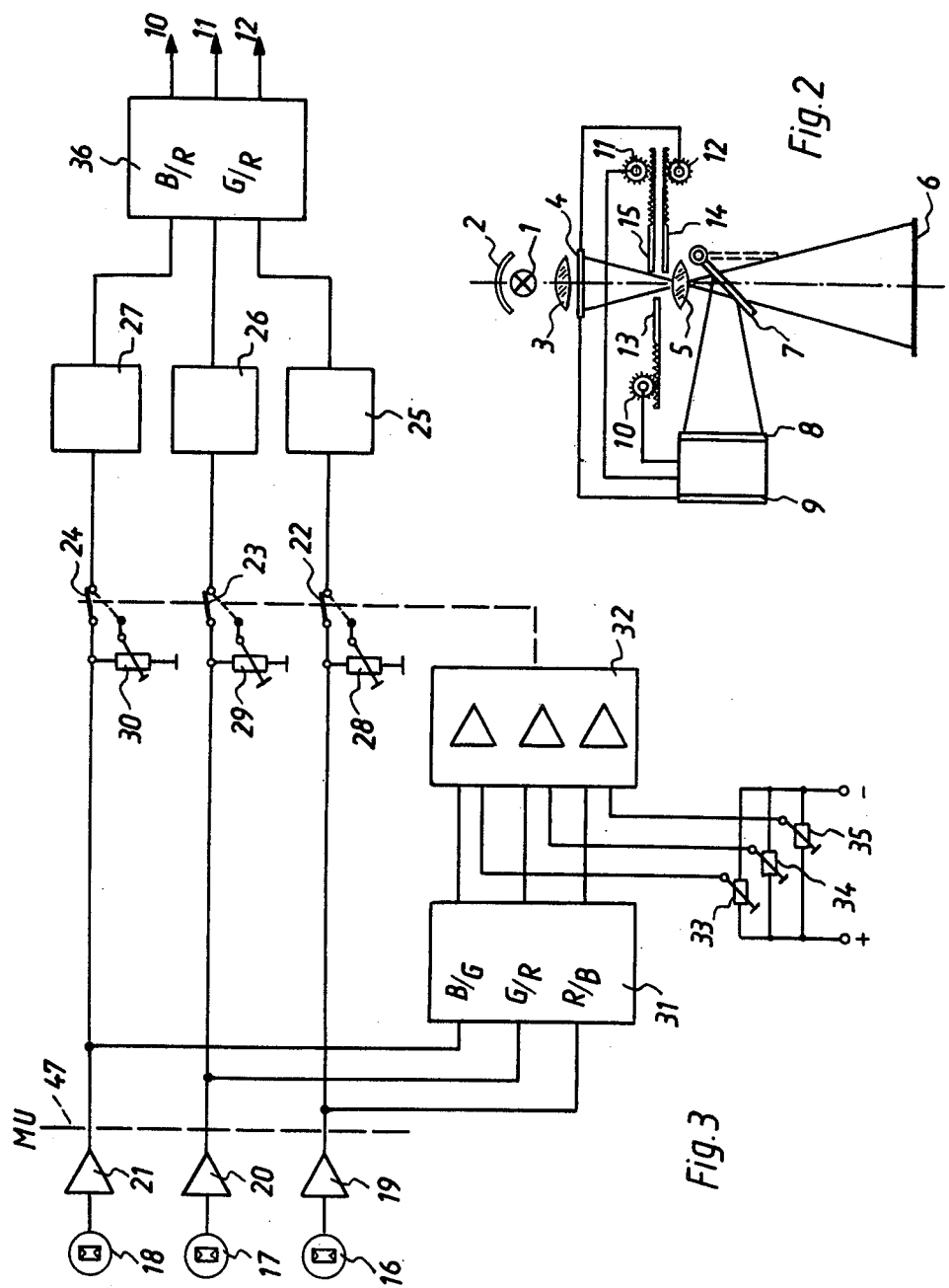

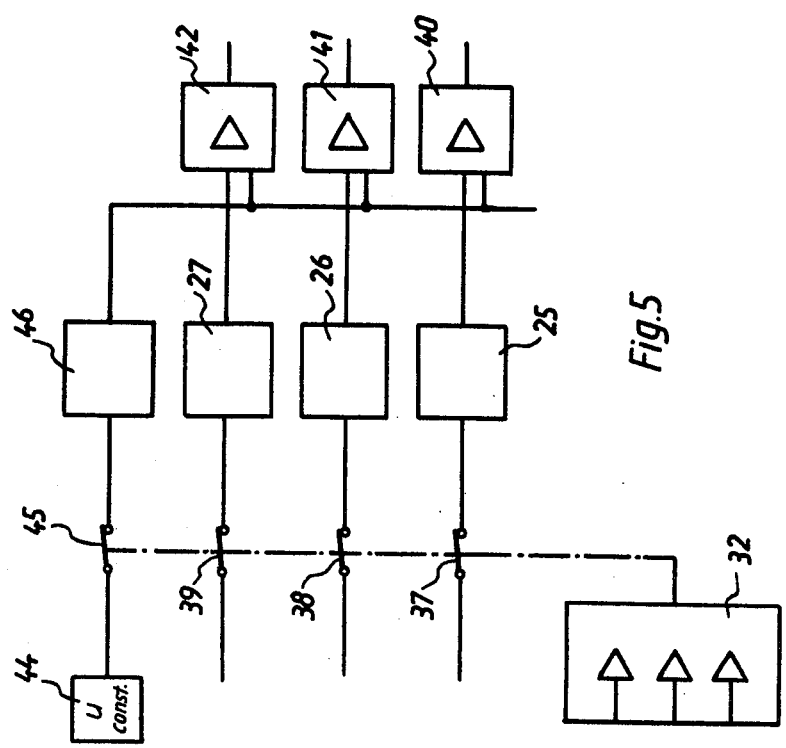

AUTOMATIC COLOR PRINTING APPARATUS

BACKGROUND OF THE INVENTION

The present invention relates to photographic color printing apparatus in general, and more particularly to improvements in exposure control units for photographic color printing apparatus. Still more particularly, the invention relates to improvements in exposure controls of the type which comprise means for scanning and analyzing different areas or fields of originals to be copied.

German Offenlegungsschrift No. 1,597,066 discloses a color printing apparatus wherein the original is assumed to be subdivided into several fields each of which is monitored in order to determine the average contrast. The exposure is controlled in dependency on the results of scanning of that field which exhibits the maximum average contrast. The operation of such printing apparatus is based on the premise that the important part of an original (i.e., that part which should be reproduced with a maximum degree of accuracy) normally exhibits a high average contrast. This insures that the exposure controls do not take into consideration relatively large areas of identical color, i.e., those areas of the scene which exhibit so-called subject failure, such as would cause a shift in the color balance when the operation of the apparatus is based on the so-called neutral grey compensation principle.

A drawback of the just described printing apparatus is that the determination of average contrast is a complex procedure and necessitates resort to expensive and highly sensitive equipment. Moreover, only a relatively small portion or field of the original is taken into consideration for determination of the quantities of printing light for the entire reproduction. This follows necessarily because the monitoring of a major area could embrace the scanning of a relatively large area of predominant color which would produce subject failure.

OBJECTS AND SUMMARY OF THE INVENTION

An object of the invention is to provide a novel and improved photographic printing apparatus wherein the selection of important areas or fields of originals for evaluation of additive primary color distribution therein can be achieved with a high degree of accuracy and by resorting to relatively simple and inexpensive equipment.

Another object of the invention is to provide a novel and improved exposure control for use in photographic color printing apparatus.

The invention is embodied in a photographic color printing apparatus wherein originals (such as color transparencies) are imaged onto copy sheets of photographic paper or analogous photosensitive receptors and at least some originals include areas or fields of predominant color (e.g., blue when the original carries an image including the image of a sea, lake and/or of a portion of clear skies). More particularly, the invention is embodied in an exposure control which forms part of or is associated with color printing apparatus and comprises signal transmitting photosensitive transducer means, such as photoelectric cells, which is operative to scan a plurality of discrete areas of an original in the primary colors (the transducer means may comprise a set of three transducers each of which is sensitized in a different primary color or a set of transducers for each area of an original), signal transmitting means for integrating the signals from the transducer means (such integrating means may comprise three integrating circuits each having an input which receives signals produced on the scanning of the areas of an original for the ratio of a particular primary color therein), signal transmitting means for evaluating signals furnished by the transducer means for the presence or absence of areas of predominant color (such evaluating means may comprise a single evaluating circuit or a discrete evaluating circuit for each set of transducers, and each evaluating circuit has three outputs for signals which are indicative of the ratio of different pairs of primary colors in an area of the original), signal transmitting means for comparing signals from the evaluating means with reference signals to thus determine whether or not a particular area of the monitored original includes a predominant primary color (the comparing means preferably comprises a discrete comparator circuit for each evaluating circuit), switches or analogous means for modifying the signals which are transmitted from the transducer means to the integrating means when the comparing means detects an area of predominant color, and means for regulating the exposure of a receptor to printing light in different primary colors in response to signals from the integrating means. The regulating means may comprise one or more comparator amplifiers or analogous means for determining the ratio of printing light in the primary colors as a function of the intensity of signals from the respective integrator circuits.

The switches of the aforementioned modifying means are preferably arranged to at least reduce the intensity of signals which are transmitted by the transducer means to the integrating means when the comparing means detects an area of predominant color.

The novel features which are considered as characteristic of the invention are set forth in particular in the appended claims. The improved color printing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a front elevational view of an original whose image can be reproduced onto a photosensitive receptor in a photographic color printing apparatus which embodies the invention;

FIG. 2 is a schematic partly elevational and partly sectional view of the improved color printing apparatus;

FIG. 3 is a circuit diagram of certain components of the exposure control in the apparatus of FIG. 2;

FIG. 4 is a circuit diagram of a portion of a modified exposure control; and

FIG. 5 is a circuit diagram of a portion of a further exposure control.

DESCRIPTION OF THE PREFERRED EMBODIMENTS

FIG. 1 shows an average original 4 (e.g., an exposed and developed color film negative) which carries the image of a landscape with mountains below a blue sky and a blue pond or lake in the forefront. The rectangular original 4 is subdivided by a system of imaginary coordinates into twelve equal fields or areas 4a each of which is or resembles a square. The color of the mountains is essentially green and grey, and the flat lands below the mountains and around the lake are basically green. In accordance with the invention, the transmissivity of each field 4a is measured in each of the three additive primary colors blue, green and red. The upper row of fields 4a is predominantly blue, the same as the two median fields 4a of the lower row. If the original 4 were copied automatically in accordance with the neutral grey principle without any compensation for the predominance of blue color in at least six of the twelve areas or fields 4a, one would obtain a neutral grey only by pronounced suppression of the blue color. This, of course, would result in a color shift and hence in a reproduction whose coloration would deviate from the coloration of the original. A satisfactory reproduction in accordance with the neutral grey compensation principle can be obtained if the exposures in each of the three primary colors are carried out by taking into consideration the other six fields 4a, i.e., those fields where blue is not the predominant color.

A photographic color printing apparatus which embodies the invention is shown in FIGS. 2 and 3. FIG. 2 shows a source 1 of copying or printing light which is located in front of a suitable reflector 2. Printing light which issues from the source 1 passes through a system of condenser lenses 3 and through the original 4. An objective lens 5 images the original onto a copy sheet 6 of photographic printing paper or another receptor. The system of condenser lenses 3 insures uniform illumination of the entire original 4. A partially light transmitting mirror 7 is mounted between the copy sheet 6 and the objective lens 5 at an angle of 45° with respect to the optical axis of the lens 5. The mirror 7 deflects a portion of printing light and causes the image of the original 4 to impinge upon a raster 8 of photoelectric transducers which form part of an exposure control or control unit 9 the details of which are shown in FIG. 3. The outputs of a regulating component 36 of the control unit 9 are connected with motors 10, 11 and 12 which respectively serve to move subtractive color filters 13, 14 and 15 into or from the path of printing light between the original 4 and objective lens 5. The motors 10 to 12 further control the extent of penetration of respective filters 13 to 15 into the path of printing light. The filters are disposed in a structure-free plane of printing light and determine the coloration of printing light. Each of these filters can completely intercept light in the respective additive primary color. Due to the fact that the filters 13 to 15 are located close to the objective plane, partial penetration of selected filters into the beam of printing light insures that each portion of the receptor is exposed only to light whose composition depends on coloration of the respective portion of the original and on the position of filters.

Prior to the making of an exposure, i.e., during monitoring of the areas or fields 4a of an original 4, each of the filters 13-15 is completely withdrawn from the path of printing light so that the filters cannot influence the scanning of the original by the raster 8 of the control unit 9. The operative connections between the motors 10 to 12 and the respective filters 13 to 15 are shown in the form of rack and pinion drives.

FIG. 3 shows a portion of the control unit 9 and of its raster 8. The raster 8 includes a group or set of three photoelectric transducers 16, 17 and 18 (e.g., photoelectric cells) for each area or field 4a of the original 4 to be scanned. The raster 8 may further include a condenser lens system or a light-dispersing pane which insures that each of the twelve sets of transducers 16-18 receives an equal share of light which has passed through the respective field 4a of the original 4. This is particularly desirable when the transducers of each set are disposed next to each other. The transducers 16, 17, 18 of each set are respectively sensitized for the primary colors blue, green and red. The outputs of these transducers are respectively connected with amplifiers 19, 20 and 21 which intensify the respective electrical signals to an acceptable level for further processing. The outputs of the amplifiers 19, 20 and 21 are respectively connected with integrator circuits 25, 26 and 27 through the medium of electric switches 22, 23 and 24. The outputs of the amplifiers 19-21 are further respectively connected with the wires of variable resistors 28, 29, 30 each of which constitutes a voltage divider and one terminal of each of which is connected to the ground. The wipers of the resistors 28 to 30 can be connected with the movable contacts of the switches 22 to 24 when the positions of such movable contacts are changed in response to a signal at the output of a comparator circuit 32 in the control unit 9.

The signals which appear at the outputs of the amplifiers 19-21 are further transmitted to the corresponding inputs of an evaluating circuit 31 which is designed to furnish signals representing the quotients (ratios) of signals furnished by the transducers 16 to 18. The voltage signals at the three outputs of the evaluating circuit 31 respectively represent the quotient of blue and green, green and red, and red and blue signals. These signals are transmitted to the comparator or signal comparing circuit 32 which further receives three reference signals respectively furnished by variable resistors 33, 34 and 35 each of which constitutes a voltage divider. The wipers of the resistors 33 to 35 are connected to the corresponding inputs of the comparator circuit 32. The output of the comparator circuit 32 transmits signals which are used to change the positions of aforementioned movable contacts of the switches 22, 23 and 24. Thus, when a comparison of reference signal furnished by resistor 33 with the signal from the corresponding (blue/green) output of the evaluating circuit 31 indicates the predominance of one of these colors, the corresponding switch 22, 23 or 24 changes its position and modifies (reduces) the intensity of signal which is transmitted by the amplifier 19, 20 or 21 to the respective integrator circuit 25, 26 or 27 by a value depending on the setting of the respective variable resistor 28, 29, 30. The second positions of movable contacts of the switches 22 to 24 are indicated by broken lines.

The outputs of the integrator circuits 25 to 27 are connected to a signal comparing amplifier 36 which compares the intensities of signals furnished by the integrator circuits and controls the operation of electric motors 10, 11 and 12 for the respective filters 13 to 15. The manner in which the amplifier 36 regulates the current requirements of motors 10 to 12 in order to effect proper movements of filters 13 to 15 into and from the path of printing light is known in the art, and the exact nature of such regulation forms no part of the invention. The control unit 9 of FIG. 3 is constructed in such a way that one of the filters 13 to 15 is always withdrawn from the path of printing light. This insures that the exposure time is reduced to a minimum and that the filters intercept relatively small amounts of printing light.

The operation:

Each area or field 4a of the original 4 is imaged onto the respective group or set of transducers 16 to 18 in the raster 8 so that each transducer transmits a signal which is indicative of the integrated color value of the respective field. If the colors are distributed essentially uniformly in the respective field 4a of the original 4, the comparator circuit 32 leaves the switches 22-24 in the illustrated positions; if not, the positions of moving contacts of the respective switches 22, 23, 24 are changed so that the intensity of signals which are transmitted to the integrator circuits 25 to 27 is modified in dependency on the positions of wipers of variable resistors 28-30. Depending on the setting of resistors 28 to 30, the intensity of signals which are transmitted to the integrators 25 to 27 can be reduced to zero if the scanning of a field 4a indicates pronounced predominance of a particular color.

The entire original 4 is scanned in the just described manner, e.g., by providing a group or set of transducers 16 to 18 for each field 4a of the original (this is the case with the raster 8 of FIG. 2) whereby the groups of transducers transmit signals seriatim to a single evaluating circuit 31 in a manner well known from the art of switchover devices one of which is indicated at 47 between the transducers 16 to 18 and the evaluating circuit 31. Alternatively, the original 4 is scanned in stages (i.e., each field 4a is scanned separately) and the results of scanning are determined for each field independently of the others. Such results are evaluated by a circuit which transmits signals in dependency on the averaging of all input signals.

When the scanning operation is completed, the integrator circuits 25 to 27 store information pertaining to the ratio of different primary colors in the original. Those areas or fields of the original wherein a certain color predominates are excluded altogether or are taken into consideration to a lesser extent (depending on the setting of variable resistors 28 to 30). The amplifier 36 thereupon regulates the operation of motors 10 to 12 in such a way that the manipulation of corresponding filters 13 to 15 does not result in complete neutral grey compensation but rather in the making of a satisfactory reproduction as a result of reduced influence of those fields 4a wherein one primary color predominates. The exposure time can be determined by all transducers of the raster 8 by resorting to a conventional integrator circuit or, alternatively, by resorting to a separate timer circuit, for example, as shown in U.S. Pat. No. 3,399,304 or 3,575,508. The number of fields 4a which are disregarded, either completely or in part (due to predominance of a particular primary color), does not adversely influence the ratio of color values in the integrator circuits 25 to 27. Thus, it is not necessary to resort to additional steps in order to take into consideration that field 4a or those fields wherein a particular color predominates.

An important advantage of the improved exposure control unit is that it is capable of carrying out a color analysis of each and every area of an original and of modifying signals from the transducers to the integrating means in response to detection of each and every area of predominant color, irrespective of the number and/or distribution of such areas in an original. The modification may include a reduction of the intensity of signals or complete interruption of signal transmission to the integrating means when the comparing means (circuit 32) detects the presence of an area of predominant color. The improved exposure control unit takes into full consideration each and every area of an original wherein none of the primary colors are predominant, even if such areas are remote from each other and are partially or completely surrounded by areas of predominant color.

It has been found that the improved exposure control is capable of insuring the making of highly satisfactory color prints or the like, and this is especially important in color printing apparatus wherein all operations are automated, even to such an extent that the operation does not necessitate any human supervision. As a rule, the quality of reproductions is invariably superior to those made in presently known automatic color printers.

FIG. 4 shows a time-regulated exposure control or control unit (in contrast to the intensity-regulated unit 9) wherein all such components which are identical with or clearly analogous to corresponding components of the control unit 9 are denoted by similar reference characters. The difference between the control units of FIGS. 3 and 4 is that the latter control unit is incorporated in a color printing apparatus wherein the exposure of copy sheet (not shown) to essentially white printing light in three different primary colors begins simultaneously but is terminated after different intervals of exposure. In other words, a subtractive color filter is moved across the entire path of printing light as soon as the amount of light in the respective primary color suffices for a satisfactory exposure. The exposure is completed when the last of the three subtractive color filters has been moved across the path of printing light. This can take place simultaneously with closing of a conventional shutter. In such color printing apparatus, each color channel contains a discrete integrator circuit which totalizes the necessary amount of light in the respective color and continuously compares the totalized amount with a reference value. When the measured amount equals that which is indicated by the reference signal, the corresponding subtractive color filter is moved across the path of printing light.

In the control unit of FIG. 4, the transducers 16 to 18 indicate the color balance in the respective field, and they serve to furnish, during the exposure, an integration current for the entire scanned area of an original. Therefore, the control circuit of FIG. 4 must comprise a set or group of three transducers 16 to 18 for each area or field of the original, the same as described in connection with the raster 8 of FIG. 2, and each transducer of each set or group is sensitized for a different primary color. The number of amplifiers 19 to 21 is also three times the number of fields in an original. If a discrete evaluating circuit 31 and a discrete comparator circuit 32 is provided for each field of the original, each circuit 32 can maintain the respective switches 37, 38, 39 for the integrator circuits 25, 26, 27 in the corresponding positions during the entire interval of exposure. In such color printing apparatus, the exposure can begin simultaneously with start of the scanning operation. This insures that each copying cycle requires a minimum amount of time. On the other hand, the control unit of FIG. 4 is more complex than the control unit of FIG. 3.

If the control unit of FIG. 4 does not comprise a discrete evaluating circuit 31 and a discrete comparator circuit 32 for each field of an original, i.e., if one and the same circuit 31 and/or 32 is used for the scanning of several fields (or for the scanning of all fields), the switches 37, 38 and 39 can be operated only one after the other and means must be provided to maintain these switches in newly selected positions. It is clear that the illustrated switches can be replaced by flip-flops or by other types of electronic switching means without departing from the spirit of the invention. In such color printing apparatus, the exposure of a copy sheet to printing light can begin only upon completion of scanning of all fields of the respective original.

The switches 37 to 39 assume the positions of FIG. 4 in the absence of predominance of a particular primary color. The signals which are produced by the amplifiers 19 to 21 are then transmitted directly to the respective integrator circuits 25 to 27. When the positions of the moving contacts of switches 37 to 39 are changed, i.e., when such moving contacts engage the respective terminals 37a, 38a, 39a, the outputs of the amplifiers 19 to 21 are connected with auxiliary or secondary inputs a of the respective integrator circuits 25 to 27 and the terminals 37a to 39a are further connected to each other. The switches 37 to 39 are connected in parallel with switches which are active during scanning of other fields of an original 4.

The outputs of the integrator circuits 25 to 27 shown in FIG. 4 are connected with the inputs of discrete signal comparing amplifiers 40, 41 and 42 which compare the signals furnished by circuit 25 to 27 with a reference signal transmitted by a voltage source 43. When the ratio of intensity of signal from reference source 43 to the intensity of signal from integrator circuit 25, 26 or 27 reaches a preselected value, the output of the amplifier 40, 41 or 42 causes the respective motor 10, 11 or 12 (not shown in FIG. 4) to terminate the exposure of a copy sheet to light in the respective color by moving the associated subtractive filter across the path of printing light. For example, each of the motors which receive signals from the amplifiers 40 to 42 may constitute a simple electromagnet which can move the associated subtractive filter into or from the path of printing light.

The operation of the apparatus which embodies the control unit of FIG. 4 is otherwise analogous to that of the apparatus which is shown in FIG. 2. The operation of components including the transducers 16 to 18, amplifiers 19 to 21, circuits 31, 32 and variable resistors 33 to 35 is identical with the operation of similarly numbered components in the control unit of FIG. 3.

A problem which arises in connection with printing apparatus embodying means for terminating the exposure of a copy sheet to light in the three primary colors on the basis of totalized photocurrents is that, whereas certain fields of an original are to be excluded from consideration as regards the ratio of green, blue and red printing light due to predominance of a particular color, such fields nevertheless require consideration in determining the total amount of printing light. This is solved, in accordance with a feature of the invention, by the aforementioned electrical connection between the terminals 37a to 39a of the switches 37 to 39 shown in FIG. 4. Thus, if a particular color predominates in a given field of the original, such field is not taken into consideration for regulation of exposures in individual colors. However, the input a of the integrator circuits 25 to 27 receive an average voltage signal which influences the output signals of integrator circuits in the same way as if the corresponding field of the original were to exhibit an average grey value. In this manner, the corresponding field of the original does not influence the ratio of different colors; however, such field influences the total amount of copying light due to its white density.

The operation of the apparatus which includes the control unit of FIG. 4 is as follows:

It is assumed that the number of circuits 31 and 32 in the control unit of FIG. 4 equals the number of fields in the original. The comparator circuits 32 maintain, at the start of an exposure, the switches 37 to 39 in positions which are indicative of color distribution in the respective fields. This starts the operation of integrator circuits 25 to 27. The fields whose scanning resulted in the shifting of movable contacts of switches 37 to 39 to the positions in which the movable contacts engage the terminals 37a to 39a also contribute to a rise of voltage in the integrator circuits 25-27; however, their contribution to a rise of voltage is uniform so that they do not cause any differences in the ratio of exposure times in different colors. They merely change the overall exposure time or the total amount of printing light which reaches the copy sheet 6. When the intensity of signals at the outputs of integrator circuits 25 to 27 reaches a value which suffices to switch on the respective amplifiers 40, 41, 42, the associated filters are moved across the path of printing light. The exposure is terminated when the last filter moves across such path. The next original is scanned in the same way whereby the moving contacts of the switch 37-39 may but need not remain in the positions corresponding to those during the previous exposure.

FIG. 5 shows a portion of a third control unit wherein all such parts which are identical with the corresponding parts of the control unit of FIG. 4 have been omitted for the sake of clarity. Thus, the control unit of FIG. 5 also comprises transducers, amplifiers which transmit signals to the integrator circuits 25 to 27, evaluating circuit means and sources of reference signals which are connected with the comparator circuits 32 (one shown). The control unit of FIG. 5 further comprises a source 44 of constant voltage which is connected with an auxiliary or additional integrator circuit 46 through the medium of an additional switch 45 in parallel with the switches 37 to 39. The integrator circuit 46 furnishes voltage for the amplifiers 40 to 42 whose function is analogous to that of similarly referenced amplifiers in the control unit of FIG. 4. The purpose of the source 44 is to furnish compensating voltage signals for those fields of an original which have not been considered in determining the ratio of three primary colors due to predominance of a particular color therein. As described in connection with FIG. 4, the transducers (not shown in FIG. 5) transmit signals which are indicative of the ratio of the corresponding primary colors in the respective field of an original, and the signals are integrated during the entire interval of exposure. The end result is the same as in the control unit of FIG. 4. Thus, the fields wherein a particular color is predominant do not influence the ratio of green, blue and red printing light but such fields do influence the exposure time. The additional integrator circuit 46 of FIG. 5 delays the rise in intensity of voltage signals in the amplifiers 40 to 42 in dependency on the number of fields which are not considered for determination of the ratio of green, blue and red in the printing light and, consequently, such fields influence the overall exposure time and hence the overall density of the reproduction. Thus, the difference between the control units of FIGS. 4 and 5 is that, in FIG. 4, the interval which is required to cause the amplifier 40, 41 or 42 to actuate the associated motor is determined only by signals transmitted by the output of the corresponding integrator circuit 25, 26 or 27. The amplifiers 40 to 42 of FIG. 5 are influenced by the associated integrator circuits 25 to 27 and (for each field wherein a color predominates) also by signals from the additional integrator circuit 46.

The control unit of FIG. 5 is simpler than the control unit of FIG. 4; however, the average density of the field with a predominant color does not influence the quality of the reproduction. As a rule, the source 44 is adjusted to furnish an average voltage which is most satisfactory for a typical original, i.e., for an original of a type which is most likely to be sent in for the making of color prints.

The transducers 16 to 18 can constitute photoelectric cells or any other photosensitive transducers, e.g., transducers which need not be in circuit with amplifiers such as the amplifiers 19 to 21. Moreover, the entire control unit may constitute a digital circuit. Still further, each original can be subdivided into a larger or smaller number of areas of fields, e.g., 100, 120 or more. Such fields are actually portions of the respective original without any demarcation lines therebetween, i.e., they are integral portions of an original and are scanned seriatim by a single set of transducers or simultaneously by several sets of transducers. As mentioned above, the number of transducer sets may exceed one and may but need not equal the number of fields.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a photographic color printing apparatus wherein originals are imaged onto photosensitive receptors and at least some originals include areas of predominant color, an exposure control comprising signal transmitting photosensitive transducer means operative to scan the areas of an original in the primary colors; signal transmitting means for evaluating signals from said transducer means for the presence of areas of predominant color; signal transmitting means for integrating the signals from said transducer means in the primary colors; signal transmitting means for comparing signals from said evaluating means with reference signals; means for modifying the signals from said transducer means to said integerating means in response to signals transmitted by said comparing means and indicative of areas of predominant color, said modifying means comprising switching means operative to at least reduce the intensity of signals from said transducer means to said integrating means in response to signals transmitted by said comparing means on scanning of an area of predominant color; and means for regulating the exposure of a receptor in response to signals from said integrating means.

2. An exposure control as defined in claim 1, wherein said transducer means comprises at least three discrete transducers each sensitized for a different primary color and said integrating means comprises at least three discrete integrator circuits each having an input connected with a different transducer.

3. An exposure control as defined in claim 2, wherein said evaluating means comprises means for producing signals which are indicative of the ratio of different primary colors in discrete areas of an original.

4. An exposure control as defined in claim 3, further comprising a source of printing light, said regulating means comprising means for determining the ratio of printing light in the primary colors as a function of the intensity of signals from the respective integrator circuits.

5. An exposure control as defined in claim 1, further comprising voltage divider means, said switching means being operative to connect said transducer means with said integrating means by way of said voltage divider means in response to signals transmitted by said comparing means on scanning of an area of predominant color.

6. An exposure control as defined in claim 1, further comprising a source of printing light and means for directing printing light from an original to the respective receptor, said regulating means comprising a plurality of color filters, one for each of said primary colors, motor means operative to move said filters at least partially across and from the path of printing light between the original and the respective receptor, and means for operating said motor means including amplifier means arranged to compare the signals transmitted by said integrating means.

7. An exposure control as defined in claim 6, wherein the colors of said filters are complementary to said primary colors.

8. An exposure control as defined in claim 6, wherein said directing means defines a structure-free plane of printing light and said filters are movable across the path of printing light in the region of said plane.

9. An exposure control as defined in claim 8, wherein said motor means is arranged to move all of said filters simultaneously across the path of printing light at the start of an exposure to an extent which is a function of the intensity of respective signals from said amplifier means and by insuring the absorption of relatively small quantities of printing light by said filters, and further comprising means for terminating the exposure after elapse of a predetermined interval of time.

10. An exposure control as defined in claim 9, wherein said comparing means is operative prior to the making of an exposure and said terminating means includes an integrator circuit having means for terminating the exposure in response to a reduction of the intensity of signal at the output of said integrator circuit below a predetermined threshold value.

11. An exposure control as defined in claim 1, wherein said transducer means comprises a discrete set of transducers for each of several areas of an original, each transducer of each of said sets being sensitized for a different primary color.

12. An exposure control as defined in claim 11, further comprising an amplifier connected between each of said transducers and said integrating means.

13. An exposure control as defined in claim 11, wherein said regulating means includes means for starting the exposure of a receptor to printing light simultaneously in each of said primary colors and for terminating the exposure to printing light in a given primary color with a delay which is a function of the intensity of corresponding signal from said integrating means.

14. An exposure control as defined in claim 1, wherein said transducer means comprises a discrete set of transducers for each of several areas of an original, each transducer of a set being sensitized for a different primary color, and further comprising means for connecting said sets of transducers seriatim to said integrating means and said evaluating means.

15. In a photographic color printing apparatus wherein originals are imaged onto photosensitive receptors and at least some originals include areas of predominant color, an exposure control comprising signal transmitting photosensitive transducer means operative to scan the areas of an original in the primary colors, said transducer means comprising a discrete set of transducers for each of several areas of an original, each transducer of each of said sets being sensitized for a different primary color; signal transmitting means for evaluating signals from said transducer means for the presence of areas of predominant color; signal transmitting means for integrating the signals from said transducer means in the primary colors; signal transmitting means for comparing signals from said evaluating means with reference signals; means for modifying the signals from said transducer means to said integrating means in response to signals transmitted by said comparing means and indicative of areas of predominant color, said modifying means comprising switch means connected between said transducers and said integrating means and said switch means being movable to and from a predetermined position in which said transducers are connected with said integrating means in the absence of a signal transmitted by said comparing means and indicative of an area of predominant color; and means for regulating the exposure of a receptor in response to signals from said integrating means, said regulating means including means for starting the exposure of a receptor to printing light simultaneously in each of said primary colors and for terminating the exposure to printing light in a given primary color with a delay which is a function of the intensity of corresponding signal from said integrating means.

16. An exposure control as defined in claim 15, wherein said evaluating means comprises a discrete evaluating circuit for each set of transducers and said comparing means comprises a discrete comparator circuit for each evaluating circuit.

17. An exposure control as defined in claim 16, wherein said regulating means includes means for starting the making of an exposure simultaneously with the start of scanning of the areas of an original by the respective sets of transducers.

18. In a photographic color printing apparatus wherein originals are imaged onto photosensitive receptors and at least some originals include areas of predominant color, an exposure control comprising signal transmitting photosensitive transducer means operative to scan the areas of an original in the primary colors, said transducer means comprising a discrete set of transducers for each of several areas of an original, each transducer of a set being sensitized for a different primary color; signal transmitting means for evaluating signals from said transducer means for presence of areas of predominant color; signal transmitting means for integrating the signals from said transducer means in the primary colors; means for connecting said sets of transducers seriatim to said integrating means and said evaluating means; signal transmitting means for comparing signals from said evaluating means with reference signals; means for modifying the signals from said transducer means to said integrating means in response to signals transmitted by said comparing means and indicative of areas of predominant color, said modifying means comprising switches movable to and from predetermined positions in which said transducers are directly connected with said integrating means and remaining in said predetermined positions in the absence of signals transmitted by said comparing means on detection of an area of predominant color; and means for regulating the exposure of a receptor in response to signals from said integrating means.

19. In a photographic color printing apparatus wherein originals are imaged onto photosensitive receptors and at least some originals include areas of predominant color, an exposure control comprising signal transmitting photosensitive transducer means operative to scan the areas of an original in the primary colors, said transducer means comprising at least three discrete transducers each sensitized for a different primary color; signal transmitting means for evaluating signals from said transducer means for the presence of areas of predominant color; signal transmitting means for integrating the signals from said transducer means in the primary colors, said integrating means including at least three first and at least three second inputs; signal transmitting means for comparing signals from said evaluating means with reference signals; means for modifying the signals from said transducer means to said integrating means in response to signals transmitted by said comparing means and indicative of areas of predominant color, said modifying means including a discrete switch for each first input of said integrating means and said switches being movable between first and second positions in which said transducers are respectively connected with the respective first and second inputs of said integrating means when said comparing means respectively transmits signals which are indicative of areas without and of predominant color; means for connecting said second inputs to each other; and means for regulating the exposure of a receptor in response to signals from said integrating means.

20. An exposure control as defined in claim 19, wherein said regulating means comprises a discrete amplifier for each of said primary colors and said integrating means includes at least three discrete integrator circuits each having one of said first and second inputs and an output connected with a first input of a different one of said amplifiers, each of said amplifiers further having a second input and further comprising a source of reference signals connected with the second outputs of said amplifiers.

21. In a photographic color printing apparatus wherein originals are imaged onto photosensitive receptors and at least some originals include areas of predominant color, an exposure control comprising signal transmitting photosensitive transducer means operative to scan the areas of an original in primary colors, said transducer means comprising at least three discrete transducers each sensitized for a different primary color; signal transmitting means for evaluating signals from said transducer means for the presence of areas of predominant color; signal transmitting means for integrating the signals from said transducer means in the primary colors, said integrating means comprising three integrating circuits, one for each of said transducers, and an additional integrating circuit; signal transmitting means for comparing signals from said evaluating means with reference signals; means for modifying the signals from said transducer means to said integrating means in response to signals transmitted by said comparing means and indicative of areas of predominant color; a source of constant voltage; and means for regulating the exposure of a receptor in response to signals from said integrating means, said regulating means comprising three amplifiers, one for each of said three integrating circuits and each having a first input connected with the output of the respective integrating circuit and a second input connected with the output of said additional integrating circuit, said modifying means comprising three switches normally connecting said transducers with the inputs of the respective ones of said three integrating circuits and an additional switch, said comparing means being operative to open said three switches and to close said additional switch on scanning of an area of predominant color.

* * * * *